United States Patent [19]
Purcell et al.

[11] Patent Number: 6,128,690
[45] Date of Patent: Oct. 3, 2000

[54] SYSTEM FOR REMOTE MEMORY ALLOCATION IN A COMPUTER HAVING A VERIFICATION TABLE CONTAINS INFORMATION IDENTIFYING REMOTE COMPUTERS WHICH ARE AUTHORIZED TO ALLOCATE MEMORY IN SAID COMPUTER

[75] Inventors: Brian T. Purcell; Jay C. Brinkmeyer, both of Tomball, Tex.

[73] Assignee: Compaq Computer Corporation, Houston, Tex.

[21] Appl. No.: 09/047,018

[22] Filed: Mar. 24, 1998

[51] Int. Cl.[7] .................................................... G06F 13/14
[52] U.S. Cl. .......................... 710/240; 709/217; 711/129; 711/147; 711/148
[58] Field of Search ................................ 709/217; 710/1, 710/240; 711/129, 147, 148

[56] References Cited

U.S. PATENT DOCUMENTS

| | | | |
|---|---|---|---|
| 5,093,913 | 3/1992 | Bishop et al. | 711/152 |
| 5,237,673 | 8/1993 | Orbits et al. | 711/170 |
| 5,394,555 | 2/1995 | Hunter et al. | 711/148 |
| 5,644,575 | 7/1997 | McDaniel | 370/416 |
| 5,721,828 | 2/1998 | Frisch | 709/217 |
| 5,778,429 | 7/1998 | Sukegawa et al. | 711/129 |
| 5,829,052 | 10/1998 | Pawlowski et al. | 711/147 |
| 5,898,883 | 4/1999 | Fujii et al. | 711/147 |

OTHER PUBLICATIONS

Mendel, Brett; "Server I/O all set to flow"; *Lantimes*, Oct. 27, 1997, vol. 14, Issue 22; cover page and p. 31.

Briggs, Chris; "Smarter and Faster I/O for Servers"; CORE: Operating Systems; *Byte*, May 1, 1996, vol. 2, No. 5.

Thompson, Tom; "I2O Beats I/O Bottlenecks"; *Byte*, Aug. 1997, pp. 85, 86 and 3 additional pages.

I2O Introduction; Technology Backgrounder; Aug. 13, 1997; http://www.i2osig.org/Architecture/TechBack.html.

i960®RP I/O Processor—the I2O SIG site; http://134.134.214.1/design/iio/i2osig.html; Feb. 6, 1998.

"Welcome to the I2O SIG® Web Site!"; http://www.i2osig.org; Feb. 6, 1998.

"About I2O Technology"; http://www.i2osig.org/Architecture; Feb. 6, 1998.

(List continued on next page.)

*Primary Examiner*—Thomas C. Lee
*Assistant Examiner*—Abdelmoniem Elamin
*Attorney, Agent, or Firm*—Jenkens & Gilchrist, a Professoinal Corporation

[57] ABSTRACT

A computer system and method for remotely allocating memory space in a memory of a remote computing device comprising a local IOP which remotely allocates memory space, for use by the local IOP, in a memory of a remote computing device. The local IOP detects a condition requiring a remote memory allocation and sends a remote allocate message to the remote computing device. The local IOP also performs an internal memory allocation in response to a remote allocate message initiated and sent by the remote computing device. The memory is partitioned to allocate distinct portions of memory for use by the IOP and the remote computing device. An allocation verification table contains data pertaining to the authorization of remote computing devices to allocate memory in the local IOP. The local IOP checks the allocation verification table to verify that the remote computing device is authorized to allocate memory. A communication network interface effectuates communication, across a communication network, between the local IOP and remote computing devices, The communication network interface sends remote allocate messages to the remote computing devices and receives remote allocate messages from the remote computing device.

16 Claims, 3 Drawing Sheets

OTHER PUBLICATIONS

"Technology Backgrounder"; http://www.i2osig.org/Architecture/TechBack.html; Feb. 6, 1998; 6 pages.

"Questions and Answers"; http://www.i2osig.org/Architecture/QandA.html; Feb. 6, 1998; 4 pages.

"I2O® Specifications For Non–members"; http://www.i2osig.org/Architecture/GetSpec.html; Feb. 6, 1998.

Amdahl, Carlton G.; "I2O Future Directions"; http://www.i2osig.org; Jun. 1996; 12 pages.

Goble, Scott, et al.; "Intelligent I/O Architecture"; http://www.i2osig.org; Jun. 1996; 22 pages.

"Press Releases and Clips"; http://www.i2osig.org/Press; Feb. 6, 1998; 4 pages.

Listing of Press Releases ; http://altavista.digital.com/cgi-bin/quer...=21%2FMar%2F86&d1=&search.x=46&search.y=6; Feb. 6, 1998; 2 pages.

Crothers, Brooke; "Intel server chip gets big backing", Oct. 7, 1997; http://www.news.com/News/Item/0,4,14962,00.html; Feb. 6, 1998.

"HP Demonstrates Commitment to I2O Standard With New I2O Disk–array Controller"; *Hewlett Packard*; Press Release, Atlanta, Oct. 8, 1997; http://hpcc920.external.hp.com/pressrel/oct97/08oct97b.html; Feb. 6, 1998; 2 pages.

"I2O: Disaster in the making for the freeware community"; http://22.kenandted.com/i2o/disaster.html; Feb. 6, 1998; 2 pages.

SYSTEM FOR REMOTE MEMORY ALLOCATION IN A COMPUTER HAVING A VERIFICATION TABLE CONTAINS INFORMATION IDENTIFYING REMOTE COMPUTERS WHICH ARE AUTHORIZED TO ALLOCATE MEMORY IN SAID COMPUTER

FIELD OF THE INVENTION

The present invention pertains in general to memory allocation in an Input/Output Processor, and more particularly, but not by way of limitation, to a method and apparatus for Peer Service Users connected to a Peripheral Component Interface bus to allocate memory space on both an Input/Output Processor where the Peer Service Users reside and on a remote Input/Output Processor.

BACKGROUND OF THE INVENTION

Computer systems have achieved wide usage in modern society. During operation, a computer system processes and stores data at a speed and at a level of accuracy many times that which can be performed manually. Successive generations of computer systems have permitted ever-increasing amounts of data to be processed at ever-increasing rates.

Computer systems are sometimes operated as stand-alone devices or connected together by way of network connections, typically together with a network server, to form a computer network. When networked together, communication between the separate computer systems is possible. Files and other data, stored or generated at one computer system, can be transferred to another computer system.

A conventional computer system typically includes one or more Central Processing Units (CPUs) capable of executing algorithms forming applications and a computer main memory. Peripheral devices, both those embedded together with a CPU or constructed to be separate therefrom, also typically form portions of a conventional computer system. Computer peripheral devices include, for instance, video graphics adapters, Local Area Network (LAN) interfaces, Small Computer System Interface (SCSI) bus adapters, and mass storage devices, such as disk drive assemblies.

A computer system further typically includes computer buses which permit the communication of data between various portions of the computer system. For example, a host bus, a memory bus, at least one high-speed bus, a local peripheral expansion bus, and one or more additional peripheral buses form portions of a typical computer system.

A peripheral bus is formed, for instance, of an SCSI bus, an Extension to Industry Standard Architecture (EISA) bus, an Industry Standard Architecture (ISA) bus, or a Peripheral Component Interface (PCI) bus. The peripheral bus forms a communication path to and from a peripheral device connected thereto. The computer system CPU, or a plurality of CPUs in a multi-processor system, communicates with a computer peripheral device by way of a computer bus, such as one or more of the computer buses noted above.

A computer peripheral, depending upon its data transfer speed requirements, is connected to an appropriate peripheral bus, typically by way of a bus bridge that detects required actions, arbitrates, and translates both data and addresses between the various buses.

A computer peripheral device forming a portion of a single computer system might well be supplied by a manufacturer other than the manufacturer of the computer CPU. If the computer system contains more than one peripheral device, the peripheral devices might also be supplied by different manufacturers. Furthermore, the computer system may be operable pursuant to any of several different operating systems. The various combinations of computer peripheral devices and computer operating systems of which a computer system might be formed quickly becomes quite large.

Software drivers are typically required for each computer peripheral device to effectuate its operation. A software driver must be specifically tailored to operate in conjunction with the particular operating system operating on the computer. A multiplicity of software drivers might have to be created for a single computer peripheral to ensure that a computer peripheral device is operable together with any of the different operating systems.

The complexity resulting from such a requirement has led, at least in part, to the development of an Intelligent Input/Output ($I_2O$) standard specification. The $I_2O$ standard specification sets forth, inter alia, standards for an I/O device driver architecture that is independent of both the specific peripheral device being controlled and the operating system of the computer system to which the device driver is to be installed.

In the $I_2O$ standard specification, the portion of the driver that is responsible for managing the peripheral device is logically separated from the specific implementation details of the operating system with which is to be installed. Because of this, the part of the driver that manages the peripheral device is portable across different computer and operating systems. The $I_2O$ standard specification also generalizes the nature of communication between the host computer system and peripheral hardware; thus, providing processor and bus technology independence.

The "split driver" model of the $I_2O$ specification, described above, allows for peripheral devices to communicate directly between each other using what is referred to as Peer-to-Peer communication. Peer-to-Peer communication allows two or more devices to communicate and transfer data between themselves with little or no involvement by the host CPU. In many instances it would be advantageous if a Peer Service User, operating on a first input/Output (IOP), could allocate memory space in the memory of a second IOP for use in Peer-to-Peer communication. For example, in certain instances, it may be advantageous for a Peer Service User operating on a second IOP to have instant access to data available to a Peer Service User operating on a first IOP. Given the ability to allocate memory space in the memory of a second IOP, the Peer Service User operating on a first IOP could transfer data directly into the memory space it allocated on a second IOP thereby allowing the Peer Service User operating on the second IOP instant access to the data.

In a second example, the Peer Service User operating on the first IOP may execute an application which requires more memory space than is presently available in the memory of the first IOP while, at the same time, the second IOP has excess memory capacity. If the Peer Service User operating on the first IOP were given the ability to allocate memory space in the memory of the second IOP, the Peer Service User operating on the first IOP could use Peer-to-Peer data transfers to utilize the additional memory space for use in executing the application.

Based upon the foregoing, is should be understood that it would be advantageous for a Peer Service User operating on a local IOP to remotely allocate memory space in the memory of a remote IOP.

SUMMARY OF THE INVENTION

The present invention comprises a method and apparatus by which a local IOP remotely allocates memory space, for use by the local IOP, in a memory of a remote computing device. The local IOP detects a condition requiring a remote memory allocation and sends a remote allocate message from the local IOP to the remote computing device to initiate a remote allocation operation in the remote computing device. The local IOP also performs an internal memory allocation to allocate memory space in the memory of the local IOP for use by the remote computing device in response to a remote allocate message initiated and sent by the remote computing device. A memory is provided for storing data allocated for use by the local IOP and the remote computing device. The memory is capable of being partitioned to allocate distinct portions of memory for use by the IOP and the remote computing device.

An allocation verification table contains data pertaining to the authorization of remote computing devices to allocate memory in the local IOP. Prior to allocating memory space in response to a memory allocation initiated by a remote computing device, the local IOP checks the allocation verification table to verify that the remote computing device is authorized to allocate memory.

A communication network interface effectuates communication, across a communication network, between the local IOP and remote computing devices connected to the communication network. The communication network interface sends remote allocate messages, initiated by the local IOP, to the remote computing devices and receives remote allocate messages initiated and sent by the remote computing device.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

The present invention performs in accordance with the Intelligent Input/Output ($I_2O$) architecture specification. In the following description of the present invention, certain aspects of the $I_2O$ specification are discussed. For instance, the hardware and software independent architecture centered around a split driver model and Peer-to-Peer communication specified in the $I_2O$ specification are used and described in connection with the present invention. It is understood that these and other aspects are well known in the industry and that a further, and more detailed, description of the operation of $I_2O$ technology is available in the Intelligent Input/Output ($I_2O$) specification. That specification, to the fullest extent possible, is hereby incorporated by this reference thereto.

Figure 1:
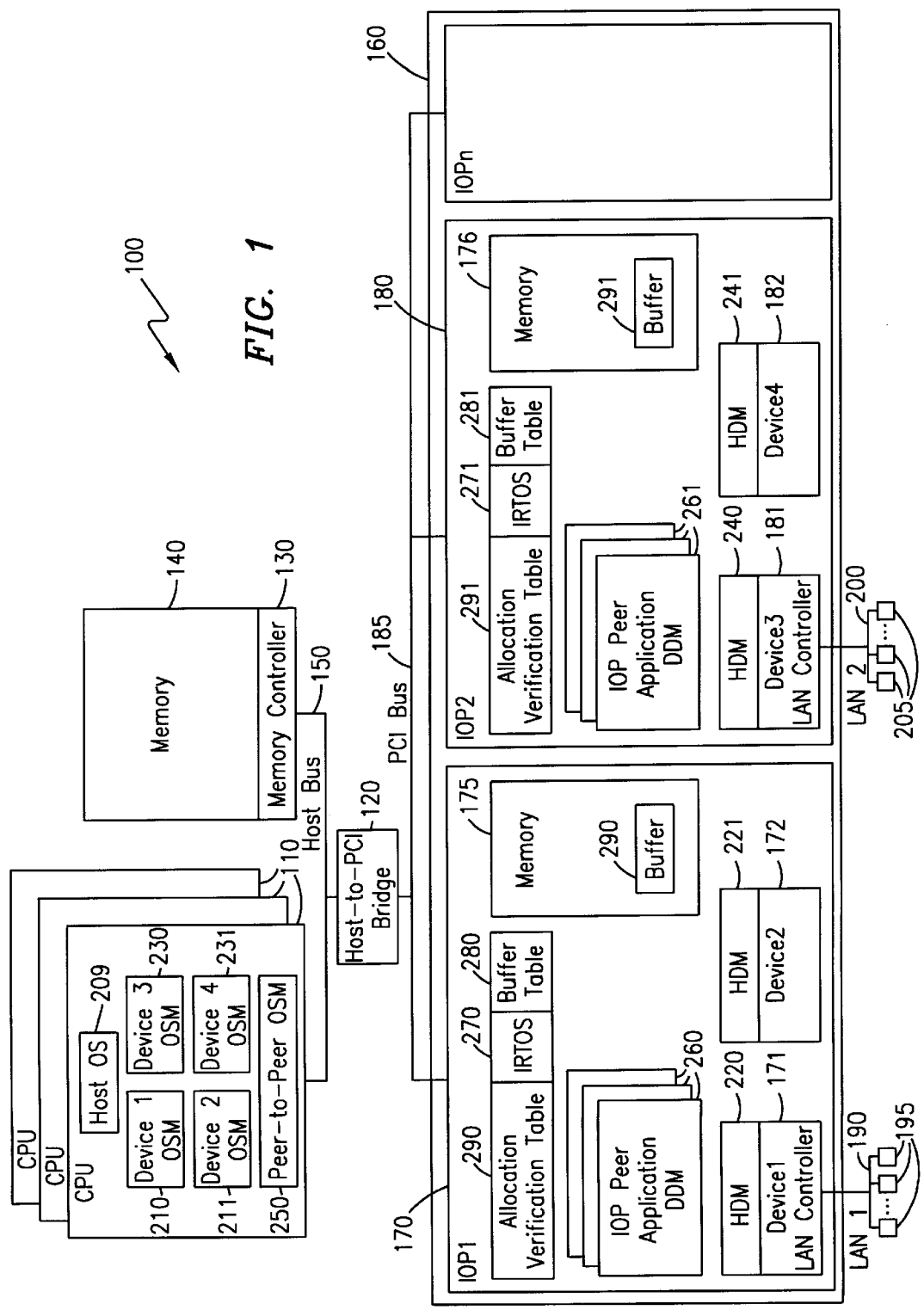
FIG. 1 is a functional block diagram of a computer system including a host processor and a plurality of IOPs communicating with one another via a PCI bus.

Referring now to FIG. 1, there is a functional block diagram of a computer system including a host processor and a plurality of IOPs communicating with one another via a PCI bus. The computer system, shown generally at 100, comprises one or more host Central Processing Unit(s) 110 communicating with a Host-to-PCI bridge 120, a memory 140 and a memory controller 130 associated with the memory 140 across a host bus 150. The computer system 100 further comprises a plurality of Input/Output Processors (IOPs) 160, including a first IOP 170 and a second IOP 180, which communicate with one another and the Host-to-PCI bridge 120 across a PCI bus 185. The first IOP 170 includes a first memory 175 which can be partitioned to form a first buffer 290. Likewise, the second IOP 180 includes a second memory 176 which can be partitioned to form a second buffer 291.

A host operating system 209 generally controls operation of the computer system 100 and, in particular, controls operation of the host CPUs 110. A first Integrated Real Time Operating System (IRTOS) 270 controls operation of the first IOP 170 while a second IRTOS 271 controls operation of the second IOP 180. The first IRTOS 270 has access to a first buffer table 280 which contains information pertaining to the partitioning and use of the first memory 175 and a allocation verification table 290 which is maintained by the host operating system 209 and contains information pertaining to the authorization of other IOPs 160 to perform remote memory allocation to the memory 175 of the first IOP 170. Likewise, the second IRTOS 271 has access to a second buffer table 281 containing information pertaining to the partitioning and use of the second memory 176 and an allocation verification table 291 which is maintained by the host operating system 209 and contains information pertaining to the authorization of other IOPs 160 to perform remote memory allocation to the memory 176 of the second IOP 180. As will be described, the first buffer table 280 and the second buffer table 281 further contain information pertaining to buffers allocated in the memories of remote IOPs.

The first IOP 170 includes a first device 171 and a second device 172. Similarly, the second IOP 180 includes a third device 181 and a fourth device 182.

Each of the devices 171, 172, 181 and 182 can be any type of peripheral system device such as, but not limited to, a Local Area Network (LAN) controller, a Small Computer Systems Interface controller (SCSI) or a Redundant Array of Independent Drives controller (RAID). For illustrative purposes, the first device 171 and the third device 181 are designated as LAN controllers which control communication with a first LAN 190 and a second LAN 200 respectively. The first LAN 190 includes a first plurality of LAN devices 195 and the second LAN 200 includes a second plurality of LAN devices 205. Although the first IOP 170 and the second IOP 180 are each depicted as supporting two devices, it is understood that each IOP may support any number and types of devices.

Each of the devices 171, 172, 181 and 182 are controlled under the direction of an associated device driver. In accordance with the split driver model of the 120 standard, each device driver is comprised of an Operating System specific Module (OSM) which operates on the host CPUs 110 and a Hardware Device Module (HDM) which operates on the IOP where the associated device resides. For example, the device driver for the first device 171 is comprised of a first OSM 210 operating on the host CPUs 110 and a first HDM 220 operating on the first IOP 170. Likewise, the device drivers for the second device 172, the third device 181 and the fourth device 182 are comprised of OSMs 211, 230 and 231 operating on the host CPUs 110 and HDM 221 operating on the first IOP 170 and HDMs 240 and 241 operating on the second IOP 180 respectively To move data from one of the first plurality of LAN devices 195 to one of the second plurality of LAN devices 205 in a non-I$_2$O compliant computer system, routing software operating on the host CPUs 110 first moves data from the first LAN device 195 to the memory 140 across the first LAN 190, through the first IOP 170, across the PCI bus 185, through the Host-to-PCI bridge 120 and across the host bus 150. The routing software operating on the host CPUs 110 then moves the data from the memory 140 to the second LAN device 205 across the host bus 150, through the Host-to-PCI bridge 120, across the PCI bus 185, through the second IOP 180 and across the second LAN 200. Movement of data from the second LAN device 205 to the first LAN device 195 is accomplished by the routing software in the reverse order. Movement of data in this fashion unnecessarily burdens the host CPUs 110 with having to control the entire process, it consumes storage capacity of the memory 140 and it lowers the bandwidth of the host bus 150 and the PCI bus 185. Peer-to-Peer communication, provided by I$_2$O technology, simplifies the movement of data and eliminates most of these transactions by allowing direct communication between the IOPs 160 over the PCI bus 185 with minimal control by the host CPUs 110.

To effectuate Peer-to-Peer communication one or more IOP Peer Application Downloadable Driver Modules (DDMs) reside and operate on each of the IOPs 160. For instance, a first plurality of IOP Peer Application DDMs 260 operate on the first IOP 170 and a second plurality of IOP Peer Application DDMs 261 operate on the second IOP 180. Generally, each application operating in conjunction with a device on an IOP has an associated IOP Peer Application DDM. The IOP Peer Application DDMs 260 and 261 operate in conjunction with a single Peer-to Peer OSM 250 which operates on the host CPUs 110. The Peer IOP Peer Application DDMs 260 and 261 resident on the respective IOPs 160 operate in conjunction with each other and the Peer-to-Peer OSM 250 to allow two or more IOPs 160 to communicate with, and move data between, each other without involving the host CPUs 110. Specific details as to the operation of Peer-to-Peer communication are well established and are available in the I$_2$O specification.

As stated in the background, it would be advantageous to allow a Peer Service User on a local IOP to allocate memory space in the memory of a remote IOP. In order to better describe the present invention the following examples and descriptions refer to the first IOP 170, its associated components and functionality as "local" and the second IOP 180, its associated components and functionality as "remote." These references reflect the particular situation provided in the examples and descriptions wherein, the first IOP 170 allocates memory space in the memory 176 of the second IOP 180. In instances where the second IOP 180 allocates memory space in the memory 175 of the first IOP 170 the "local" and "remote" labels would be reversed.

Figure 2:
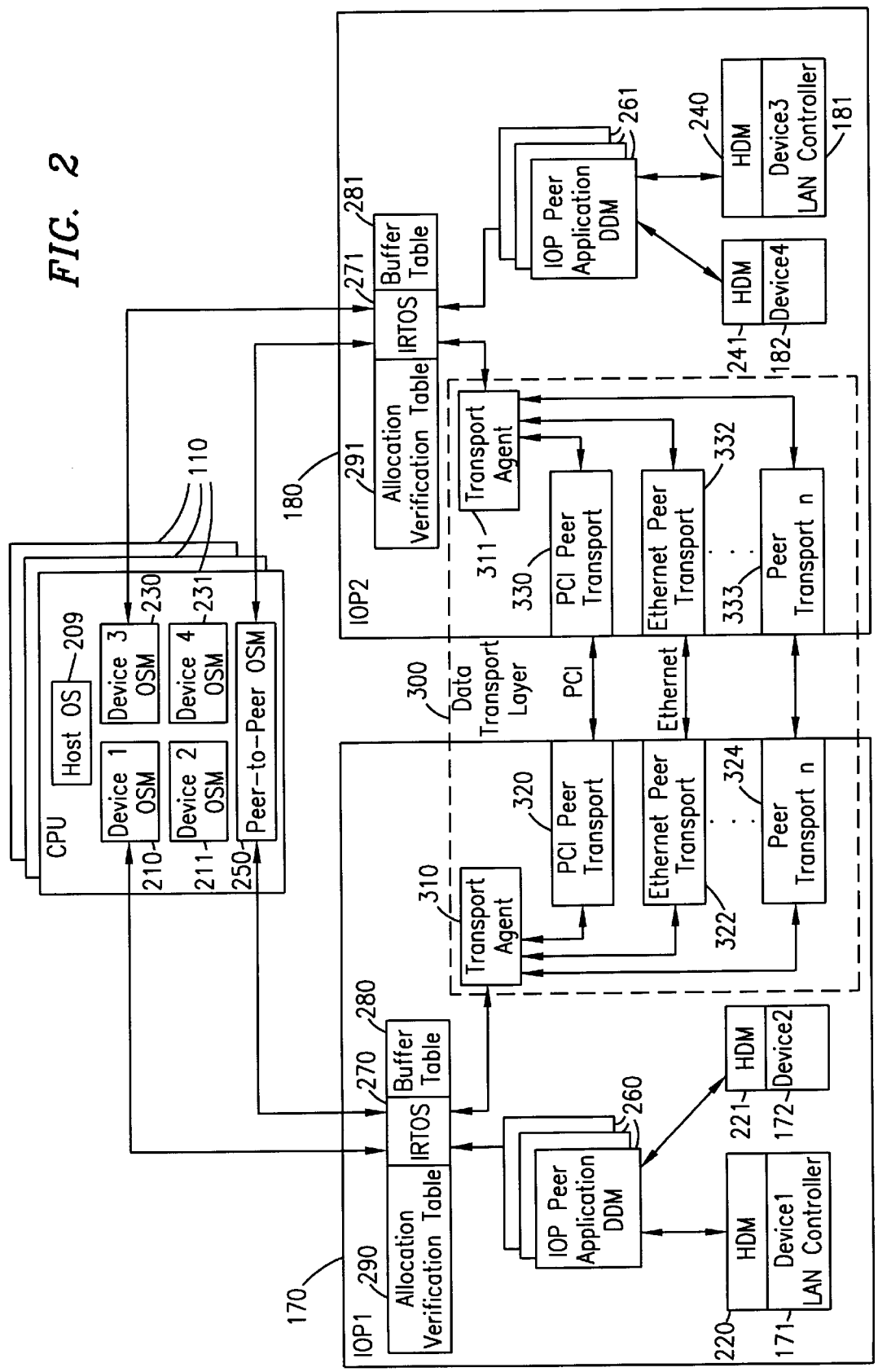
FIG. 2 is a functional block diagram of a Peer-to-Peer software architecture consistent with a preferred embodiment of the present invention.

Referring additionally now to FIG. 2, there is illustrated a functional block diagram of a Peer-to-Peer software architecture consistent with a preferred embodiment of the present invention. In addition to the components and functionality described in FIG. 1, each of the IOPs 160 include a data transport layer 300. A first transport agent 310 provides an interface between the first IRTOS 270 and the data transport layer 300 of the first IOP 170. Likewise, a second transport agent 3 11 provides an interface between the second IRTOS 271 and the data transport layer 300 of the second IOP 180. The transport layer 300 of each of the IOPs 160 includes a peer transport for each communication media and protocol supported by the particular IOP. The peer transport effectuates a communication interface between the transport layer of the particular IOP and the communication media. In FIG. 2, a first PCI peer transport 320 supports communication by the first IOP 170 on the PCI bus 185 while a first Ethernet peer transport 322 supports communication by the first IOP 170 on an Ethernet (not shown). Peer transport 324 supports communication by the first IOP 170 on any type of communication media and protocol. Likewise, a second PCI peer transport 330 supports communication by the second IOP 180 on the PCI bus 185 while a second Ethernet peer transport 332 supports communication by the second IOP 180 on the Ethernet (not shown). Peer transport 333 supports communication by the second IOP 180 on any type of communication media and protocol.

To effectuate a remote memory allocation, the local IRTOS 270 sends a remote allocate message to the remote IRTOS 271. The remote allocate message includes information identifying both the local IOP 170 and the remote IOP 180, the size of the buffer being allocated and memory parameters such as, but not limited to, type, alignment access attributes and cache properties among others. During the operation of the computer system 100, a need for memory allocation is detected. For instance, the need for memory allocation arises when data, which is to be routed to a LAN device 205 on LAN 200, is received by the first LAN controller 171. In an alternative example, the first and second LAN controllers, 170 and 180 respectively, are programmed to effectuate a continuous interface between the first LAN 190 and the second LAN 200. In this instance, the need for memory allocation arises when the LAN interface application is initiated. In either event, once the local IOP Peer Application DDM 260 determines that memory allocation is required, the local IOP Peer Application DDM 260 directs the local IRTOS 270 to perform a remote memory allocation to acquire a buffer 291 in the remote memory 176 of the remote IOP 180.

Before performing a remote memory allocation, a determination is made as to whether a buffer of sufficient size and characteristics has been previously allocated in the remote memory 176 and is currently available. For example, the local IRTOS 270 checks the local buffer table 280 to determine if a buffer of sufficient size and appropriate characteristics has previously been allocated in the remote memory 176 and is currently available. In the event that a buffer has been previously allocated and is currently available no new memory allocation occurs and the previously allocated buffer is used. If, on the other hand, a previously allocated buffer is unavailable or does not exist, the local IRTOS 270 sends a remote allocate message to the remote IRTOS 271. To send a remote allocate message to the remote IRTOS 271, the local IRTOS 270 communicates the remote allocate message to the data transport layer 300 via the local transport agent 310 which effectuates an interface between the local IRTOS 270 and the transport layer 300. The local transport agent 310 receives the remote allocate message and communicates it to the appropriate peer transport.

In the case of the example being described, the local transport agent 310 communicates the remote allocate message to peer transport 320 which supports communication on the PCI bus 185. Upon receiving the remote allocate message, the peer transport 320 communicates the remote allocate message across the respective media, using the appropriate protocol, to the corresponding peer transport 330 of the remote IOP 180. The remote peer transport 330 communicates the remote allocate message to the remote transport agent 311 and the remote transport agent 311 communicates the remote allocate message to the remote IRTOS 271.

Upon receiving the remote allocate message, the remote IRTOS 271 determines whether the local IOP 170 is authorized to allocate memory space in the memory 176 of the remote IOP 180 by comparing the identity of the local IOP 170 and the identity of the remote IOP 180, contained in the remote allocate message, against data stored in the allocation verification table 291 which is maintained by the host operating system 209. If the memory allocation is authorized, the remote IRTOS 271 determines whether the remote memory 176 has adequate memory to meet the size and characteristics requirements of the memory being allocated by comparing the size of the buffer to be allocated and parameters describing the characteristics of the buffer to be allocated contained in the remote allocate message communicated to the remote IRTOS 271 against memory utilization information contained in the remote buffer table 281.

If it is determined that the remote memory allocation is unauthorized or if it is determined that memory space is unavailable, the remote IRTOS 271 returns an unsuccessful reply message to the local IRTOS 270. If, on the other hand, the remote memory allocation is authorized and sufficient memory of appropriate characteristics is available, the remote IRTOS 271 enters data into the remote buffer table 281 to assign the memory space to the local IOP 170 and returns a successful reply message to the local IRTOS 270. The reply message is communicated to the local IRTOS 270 in the reverse order in which the remote allocate message was received Therefore, the remote IRTOS 271 communicates the reply message to the remote transport agent 311, which communicates the reply message to the remote peer transport 330, which communicates the reply message across the PCI bus 185 to the local peer transport 320. The local transport agent communicates the reply message from the transport layer 300 to the local IRTOS 270.

In addition to indicating whether the remote memory allocation was successful, the reply message includes an alias which identifies the remote buffer 291 and a scatter gather list. The scatter gather list is commonly known in the industry and contains such parameters as a memory location of the beginning of the remote buffer 291 and the length of the remote buffer 291 among other parameters. If the remote memory allocation was successful, the local IRTOS 270 enters information pertaining to the size, location and characteristics of the remote buffer 291 into the local buffer table 280 as an extension of the local memory 175.

As stated earlier, the ongoing example describes the situation wherein the first IOP 170 remotely allocates memory space in the memory 176 of the second IOP 180. Therefore, the first IOP 170, its components and functionality are labeled as "local" while the second IOP 180, its components and functionality are labeled as "remote." It is understood that any of the IOPs 160 can remotely allocate memory space in the memories of other IOPs 160. Furthermore, an IOP Peer Application DDM, associated with a first device in a particular IOP, can utilize the method of the present invention to allocate memory within the same IOP for use in communication with a second device located in the same IOP thereby effectuating Intra-IOP memory allocation. While this situation does not involve communication over a communication media by the respective peer transports it allows for a common scheme to provide memory allocation. For example, an IOP Peer Application DDM 260 allocates memory space in the memory 175 for use in communication between the first device 171 and the second device 172.

Figure 3:
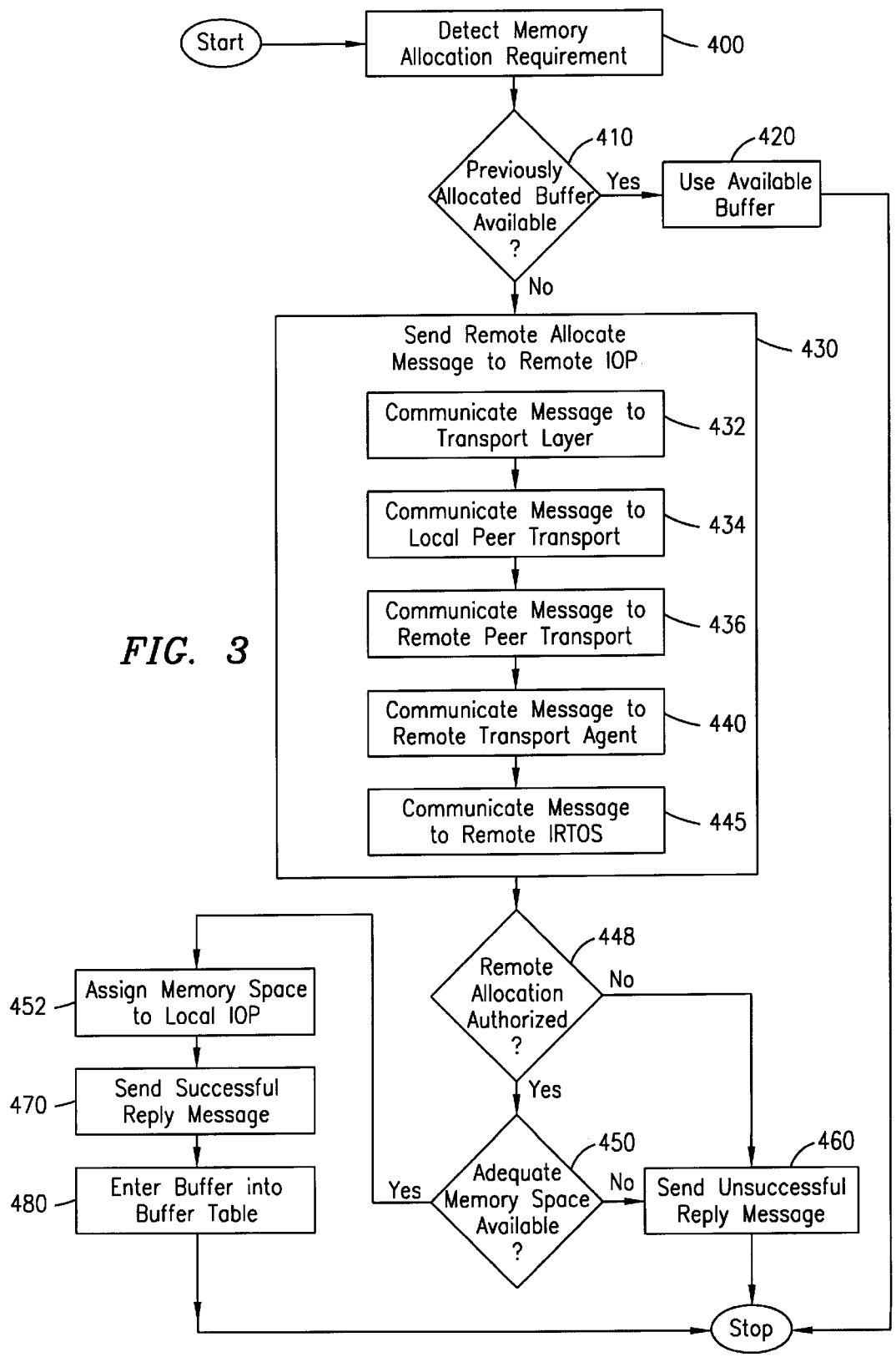
FIG. 3 is a flow diagram of a method for remotely allocating memory in an IOP consistent with the preferred embodiment of the present invention.

Referring additionally now to FIG. 3, there is illustrated a flow diagram of a method for remotely allocating memory in an IOP consistent with the preferred embodiment of the present invention. During the operation of the computer system 100, a need for memory allocation is detected (step 400). Although Peer-to-Peer communication supports a variety of applications, the ongoing example provided in this disclosure describes Peer-to-Peer communication between the first LAN controller 171 and the second LAN controller 181. In this case, the need for memory allocation arises when data, which is to be routed to a LAN device 205 on LAN 200, is received by the first LAN controller 171. In an alternative example, the first and second LAN controllers, 170 and 180 respectively, are programmed to effectuate a continuous interface between the first LAN 190 and the second LAN 200. In this instance, the need for memory allocation arises when the LAN interface application is initiated. In either event, once the local IOP Peer Application DDM 260 determines that memory allocation is required, the local IOP Peer Application DDM 260 directs the local IRTOS 270 to perform a remote memory allocation to acquire a buffer 291 in the remote memory 176 of the remote IOP 180.

Before performing a remote memory allocation, a determination is made as to whether a buffer of sufficient size and characteristics has been previously allocated in the remote memory 176 and is currently available (step 410). For example, the local IRTOS 270 checks the local buffer table 280 to determine if a buffer of sufficient size and appropriate characteristics has previously been allocated in the remote memory 176 and is currently available. In the event that a buffer has been previously allocated and is currently available no new memory allocation occurs and the previously allocated buffer is used (step 420). If, on the other hand, a previously allocated buffer is unavailable or does not exist, the local IRTOS 270 sends a remote allocate message to the remote IRTOS 271 (step 430).

To send a remote allocate message to the remote IRTOS 271, the local IRTOS 270 communicates the remote allocate message to the data transport layer 300 (step 432). The local transport agent 310 provides an interface between the local IRTOS 270 and the transport layer 300. The local transport agent 310 receives the remote allocate message and communicates it to the appropriate peer transport (step 434). In the case of the ongoing example, the local transport agent 310 communicates the remote allocate message to peer transport 320 which supports communication on the PCI bus 185. Upon receiving the remote allocate message, the peer transport 320 communicates the remote allocate message across the respective media using the appropriate protocol to the corresponding peer transport 330 of the remote IOP 180 (step 436). The remote peer transport 330 communicates the remote allocate message to the remote transport agent 311 (step 440) and the remote transport agent 311 communicates the remote allocate message to the remote IRTOS 271 (step 445).

Upon receiving the remote allocate message, the remote IRTOS 271 determines whether the local IOP 170 is authorized to allocate memory space in the memory 176 of the remote IOP 180 (step 448). To make the determination, the remote IRTOS 271 compares the identity of the local IOP 170 and the identity of the remote IOP 180, contained in the remote allocate message, against data stored in the allocation verification table 291 which is maintained by the host operating system 209. If the memory allocation is authorized, the remote IRTOS 281 determines whether the remote memory 176 has adequate memory to meet the size and characteristics requirements of the memory being allocated (step 450). To make the determination, the remote IRTOS 271 compares the size of the buffer to be allocated and parameters describing the characteristics of the buffer to be allocated contained in the remote allocate message communicated to the remote IRTOS 271 against memory utilization information contained in the remote buffer table 281.

If, in step 448, it is determined that the remote memory allocation is unauthorized or if, in step 450, it is determined that memory space is unavailable, the remote IRTOS 271 returns an unsuccessful reply message to the local IRTOS 270 (step 460). If, on the other hand, the remote memory allocation is authorized and sufficient memory of appropriate characteristics is available, the remote IRTOS 281 enters data into the remote buffer table 281 to assign the memory space to the local IOP 170 (step 452) and returns a successful reply message to the local IRTOS 270 (step 470). The reply message is communicated to the local IRTOS 270 in the reverse order in which the remote allocate message was received. Therefore, the remote IRTOS 271 communicates the reply message to the remote transport agent 311, which communicates the reply message to the remote peer transport 330, which communicates the reply message across the PCI bus 185 to the local peer transport 320, which communicates the reply message to the local transport agent 320. The local transport agent communicates the reply message from the transport layer 300 to the local IRTOS 270.

In addition to indicating whether the remote memory allocation was successful, the reply message includes an alias which identifies the remote buffer 291 and a scatter gather list. The scatter gather list is commonly known in the industry and contains such parameters as a memory location of the beginning of the remote buffer 291 and the length of the remote buffer 291 among other parameters. If the remote memory allocation was successful, the local IRTOS 270 enters information pertaining to the size, location and characteristics of the remote buffer 291 into the local buffer table 280 as an extension of the local memory 175 (step 480).

Although the preferred embodiment of the apparatus and method of the present invention has been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A computer system comprising:
   an IOP for initiating a remote memory allocation operation in a remote computing device, the IOP further for performing an internal memory allocation in response to a remote memory allocation operation initiated by the remote computing device;
   a memory for storing data, the memory capable of being partitioned to allocate distinct portions of memory for use by the IOP and the remote computing device;
   a communication network interface for effectuating communication between the IOP and computing devices connected to a communication network, the communication network interface further for sending remote allocate messages, initiated by the IOP, to the remote computing devices and receiving remote allocate messages initiated and sent by the remote computing device;
   an allocation verification table for storing information identifying remote computing devices which are authorized to allocate portions of memory for use by the remote computing device; and
   an integrated real time operating system for controlling operation of the IOP.

2. The computer system as recited in claim 1, further comprising a buffer table for storing information describing the partitioning and allocation of the memory.

3. The computer system as recited in claim 1, wherein the communication network interface is an Ethernet peer transport for effectuating communication between the IOP and other computing devices across an Ethernet.

4. The computer system as recited in claim 1, wherein the communication network interface is a PCI peer transport for effectuating communication between the IOP and other computing devices across a PCI bus.

5. The computer system as recited in claim 3, further comprising a transport agent for effectuating communication between the integrated real time operating system and the PCI peer transport.

6. The computer system as recited in claim 5, further comprising:
   a host central processing unit communicating with the IOP across the PCI bus via a host-to-PCI bus interface; and
   a host operating system for controlling operation of the host central processing unit and further for maintaining the data in the allocation verification table.

7. The computer system as recited in claim 6, further comprising:
   a IOP peer application downloadable driver module operating on the IOP; and
   a Peer-to-Peer operating system module operating on the host central processing unit, the Peer-to-Peer operating system module functioning in conjunction with the IOP peer application downloadable driver module to effectuate Peer-to-Peer communication between the IOP and other computing devices across the PCI bus.

8. A method for a local IOP to remotely allocate memory space in a memory of a remote IOP comprising the steps of:
   detecting a condition requiring remote memory allocation;
   sending a remote allocate message from the local IOP to the remote IOP in response to the detection of a condition requiring remote memory allocation; and
   allocating memory space in the memory of the remote IOP for use by the local IOP in response to the remote allocate message;
   wherein the step of detecting a condition requiring remote memory allocation further comprises the steps of:
     determining if memory space was previously allocated for use by the local IOP and is currently available; and
     terminating the remote memory allocation if memory space was previously allocated for use by the local IOP and is currently available.

9. The method as recited in claim 8, wherein the step of sending a remote allocate message from the local IOP to the remote IOP comprises the steps of:
   communicating the remote allocate message from a local integrated real time operating system of the local IOP to a local transport agent operating in a data transport layer of the local IOP;
   communicating the remote allocate message from the local transport agent to a local peer transport operating in the local IOP; and
   communicating the remote allocate message across a communication network from the local peer transport to the remote IOP.

10. The method as recited in claim 9, wherein the step of communicating the remote allocate message across a communication network further comprises the steps of:

communicating the remote allocate message from the communication network to a remote peer transport operating on the remote IOP;

communicating the remote allocate message from the remote peer transport to a remote transport agent operating in a data transport layer on the remote IOP; and communicating the remote allocate message from the remote transport agent to a remote integrated real time operating system operating on the remote IOP.

11. The method as recited in claim 9, wherein the step of communicating the message across a communication network comprises the step of communicating the message across a PCI bus using Peer-to-Peer communication.

12. The method as recited in claim 8, wherein the step of allocating memory space in the memory of the remote IOP for use by the local IOP comprises the steps of:

determining whether the local IOP is authorized to remotely allocate memory space in the memory of the remote IOP;

determining whether there is adequate memory space in the memory of the remote IOP to allocate for use by the local IOP;

terminating the remote memory allocation if either the local IOP is unauthorized or if there is inadequate memory space to allocate for use by the local IOP; otherwise allocating memory space in the memory of the remote IOP for use by the local IOP.

13. The method as recited in claim 12, wherein the step of terminating the remote memory allocation further comprises the step of sending an unsuccessful reply message from the remote IOP to the local IOP.

14. The method as recited in claim 12, wherein the step of allocating memory space in the memory of the remote IOP for use by the local IOP further comprises the step of assigning the allocated memory space to the local IOP in a buffer table of the remote IOP.

15. The method as recited in claim 12, wherein the step of allocating memory space in the memory of the remote IOP for use by the local IOP further comprises the step of sending a successful reply message to the local IOP.

16. The method as recited in claim 15, further comprising the step of entering a description of the remotely allocated memory space into a buffer table of the local IOP designating it as an extension of the memory space available to the local IOP.

* * * * *